Patented June 19, 1923.

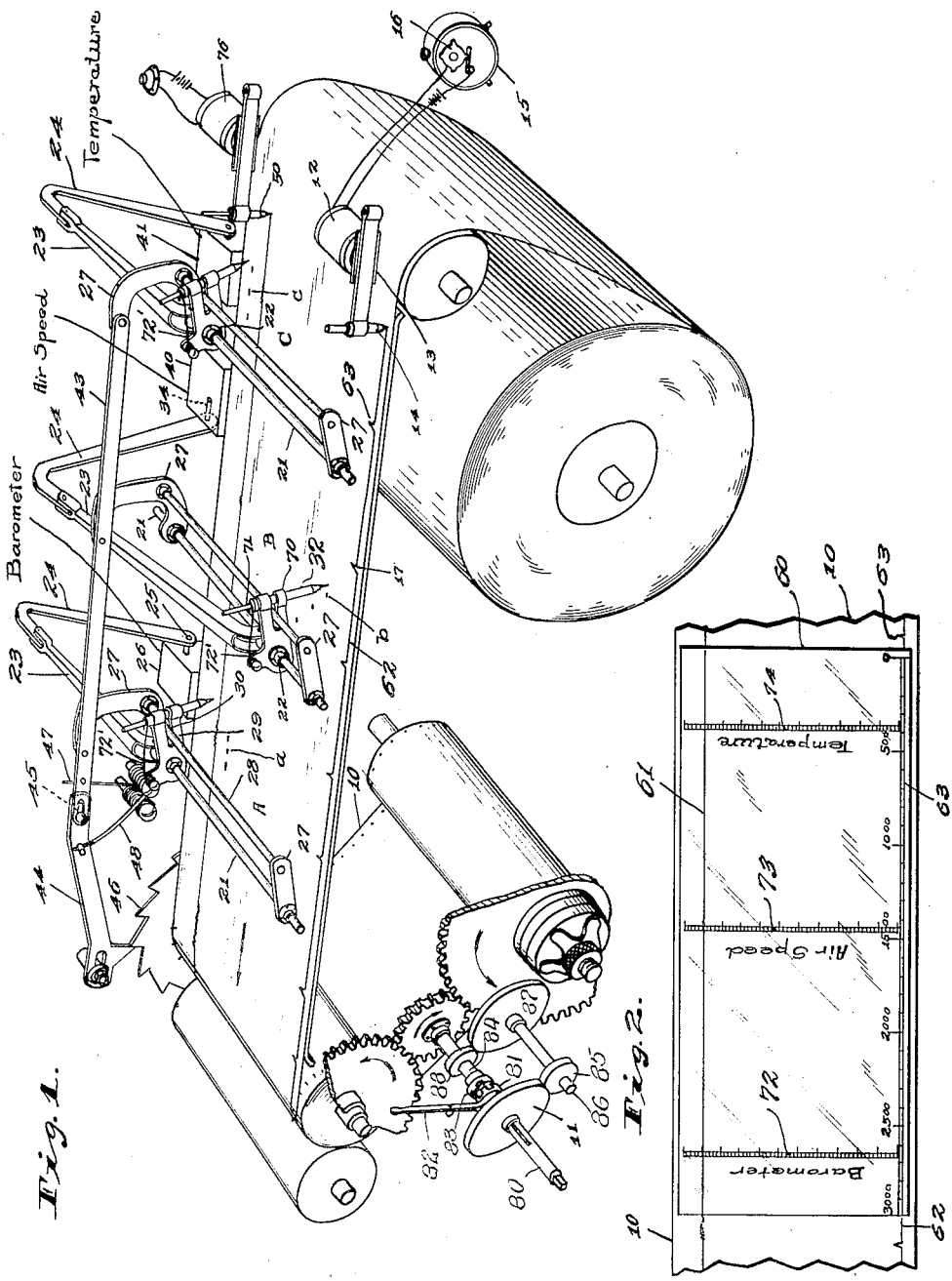

1,459,087

UNITED STATES PATENT OFFICE.

CLAUDE E. COX, OF DETROIT, MICHIGAN.

RECORDING INSTRUMENT.

Application filed September 23, 1918. Serial No 255,256.

*To all whom it may concern:*

Be it known that I, CLAUDE E. Cox, a citizen of the United States, residing at Detroit, in the county of Wayne and State of Michigan, have invented a new and useful Recording Instrument, of which the following is a specification.

In the testing of airplanes, it is desirable to accurately measure the motor speed, air temperatures, and air velocities (the resultant of plane movement and air movement) and barometric pressures, and it is the object of my present invention to provide means by which accurate graphs of these various conditions may be produced, said means comprising a recording instrument which will produce a record of considerable extent, by means of which a high degree of accuracy may be obtained; and a transparent translating member which, when applied to the record strip, and moved to successive position thereon, will greatly facilitate the selection of co-related records on said strip.

In view of the fact that the recording apparatus will comprise a thermometer, barometer and an air speed indicator of standard construction, the accompanying drawings are presented to illustrate my invention diagrammatically, Fig. 1 being a perspective diagram of the recording instrument, and Fig. 2 a plan of the transparent translating member and associated portion of a record strip.

In the drawings, 10 indicates a record strip which is to be driven by the engine whose performance is being recorded, so that the motor speed for any given period may be determined by comparing the strip length with the corresponding time record thereon. Speed change mechanism is provided to change the speed ratio relative to the motor, for different desired degrees of accuracy of interpretation of the record. For instance, if a high degree of accuracy is desired, the strip 10 will be driven at a comparatively high speed, so that the distance between the records upon the strip will be comparatively great. It will be readily understood that the speed-changing mechanism may be of any desired type. In the present drawings, I have shown this mechanism as comprising a gear 11 which is splined upon the drive shaft 80 and provided with a clutch member 81, shiftable by means of lever 82. The clutch member is adapted to engage a clutch member 83 carried by a driven shaft 84 when gear 11 is shifted out of mesh with its companion gear 85. Gear 85 is carried by a countershaft 86 which also carries a gear 87 meshing with the gear 88 secured to the driven shaft 84, the arrangement being such that when gear 11 is in mesh with its companion gear, the driven shaft will be driven through the gear train and when the gear 11 is out of mesh with its companion gear, the driven shaft will be driven by direct connection with the driving shaft.

In order to furnish a basis of comparsion, strip 10 should carry a uniform time record and for that purpose, I provide an electromagnet 12, provided with an armature 13, carrying a recording pencil 14, at all times contacting with the record strip 10. The magnet 12 is intermittently and regularly energized by a clock 15, provided with contact terminals 16, which will give uniform time interval actuation of the recorder comprising the pencil 14. I prefer to use a pencil rather than a pen, because ink does not work satisfactorily throughout wide ranges of barometric and temperature conditions, and, for the purpose of establishing the time intervals, I find it advisable to maintain the pencil in constant contact with the record strip, obtaining the time indication by a rapid lateral displacement of the pencil relative to the normal line of travel. By this arrangement, I am able to produce a record presenting a sharp and sudden departure point 17 which will accurately indicate the time period. If the motor be the engine of an airplane, or an automobile, it is evident that the speed of movement of the record strip will be a direct function of R. P. M. of the engine, and the variations in engine speed may be accurately determined by comparing distances between adjacent points 17 on the record strip. There is, therefore, no need of use of a tachometer of the usual form embodying centrifugal or magnetic elements.

In order to produce the records for barometric conditions, air speed and temperature, I provide three recording elements A, B and C, which are substantially identical and are of such character as to produce successive records longitudinally of the strip (at desired intervals which should be close enough together for ready translation), in accordance with variations of barometer, air speed-indicator and thermometer, respectively. The structure should be such as to require minimum exertion of power from the indicating instrument to properly place the recording element in position for recording, so that no element of error will be introduced on this account. It is desirable, therefore, that the recording elements of these structures A, B and C be normally out of contact with the record strip and be moved into contact with said strip, preferably simultaneously and by means under the control of the strip driver, but this is not essential, as any actuating means, either dependent upon or independent of the record strip drive may be used.

Taking element A as typical, it comprises a support, in which is pivoted a rock shaft 21, upon which is sleeved an axially-slidable sleeve 22, connected to one end of a link 23, which is connected to a lever 24 carried by shaft 25 of the barometer 26. The connection between link 23 and sleeve 22 is a universal joint which will provide for the proper freedom of movement of the link and carrier.

In order that the sleeve 22 may partake of the rocking movement of shaft 21, without being pinched thereon, I prefer, instead of making the shaft 21 non-circular in cross section, to provide said shaft with a pair of lateral arms 27, 27 between the outer ends of which is extended a rod 28 parallel with shaft 21. Sleeve 22 is then provided with an arm 29 which is perforated at 30, so as to slide freely upon rod 28. Arm 29 carries a pencil 32 at its outer end, said pencil being preferably mounted in arm 29 so as to be slightly yieldable at right angles to the shaft 21 and to the plane of record strip 10.

Element B will be similar to element A, except that its shaft 34 will be under the control of an air speed indicator 40. Any desired form of air speed indicator may be used, but so far as I am at present advised, I believe that that type of indicator which embodies a pressure-controlled element, having an interior subject to a vacuum effect produced by a Venturi tube, and an exterior subject to a pressure effect due to a Pitot tube, with the Venturi tube and the Pitot tube under the influence produced by the movement of the apparatus through the air, is probably the most efficient. This type of instrument is a standard one, and, therefore, needs no detailed description beyond that given above.

The element C will be substantially identical with elements A and B, its shaft being connected directly to the temperature-varied element 41.

In order to actuate the several elements A, B and C to produce records upon strip 10, the shafts 21 must be rocked and for that purpose, I connect the arms 27 of the several shafts 21 by a link 43, connected to a sliding pawl 44 by a pin and slot connection 45. Pawl 44 is intermittently and regularly actuated by ratchet 46 connected to the strip-driving train. Link 43 is urged, in the direction to lift the pencils, by a light spring 47 which is strong enough to normally just sustain the weight of the pencil carrying structure. Pawl 44 is urged in the opposite direction, to return the pawl after ratchet actuation, by a stronger spring 48. Each tooth of the ratchet shifts the pawl and lifts the pencils. Spring 48 then suddenly returns the parts to normal and the inertia of the pencil-carrying parts overcomes spring 47 and permits the pencil to touch the record strip and spring 47 then quickly withdraws them.

By the above arrangement, I will produce upon strip 10, three series of marks, a, b, and c, longitudinally spaced along the record-strip at fairly close intervals, and laterally spaced, or varied, without any interdependence as to each other, but each series spaced in accordance with the variations in condition, as indicated by the particular indicator which controls it. A continuously-acting pencil 50 is provided to produce a base-line on the record strip.

It is apparent that differently-colored pencils might be used for the different elements A, B and C, and in that manner distinguishment be had between the several records, but it is questionable whether such an arrangement would be entirely satisfactory.

I prefer, therefore, to use similar pencils in the three elements, and to differentiate them by providing a translator, such as is shown in Fig. 2, comprising a transparent sheet 60, carrying a base line 61, intended to be laid upon the record line produced by the pencil 50 and provided with time-line 62 having a plurality of uniformly spaced indications 63, the space between which will indicate a convenient motor speed, as, for instance, if the engine speed is normally about 2400 R. P. M., and the clock is provided with terminals 16 which give energizations of the magnet 12 every minute, the graduations 63 will have an extent denoting 2400 revolutions per minute, and will, therefore, be marked as to its main divisions, in hundreds up to slightly above 24 divisions, so as to provide a desired degree of fineness of subdivision.

This line 62 will be placed to register with the time line on the record strip, so that, by applying this scale to the time line, it will be possible to determine the precise number of revolutions of the engine which were accomplished during the period indicated by the distance between any two departure points 17.

The translating member will also be provided with three sets of laterally arranged indications 72, 73 and 74, which will be spaced from each other, lengthwise of the base line 61, by distances corresponding to the distances between the pencils of the three recording elements A, B and C, and scale 72 will be spaced from the zero of scale 61 a distance equal to the distance between pencil 14 and the pencil 29 of element C.

Scale 72 will be graduated to indicate temperature changes within the range of the instrument; scale 73 will be graduated to indicate air velocities; and scale 74 will be graduated to indicate barometric pressures, and, of course, each scale will be calibrated from the instrument with which it is to be used.

By applying the translating member to successive portions of the record strip 10, readings may be taken from the several scales on the transfer member, and graphs prepared, each of which will be in terms of time and the readings from any one of the scales.

The instrument which I have described is one which can readily be of such sturdy construction, as compared with recording instruments generally available, that it will not be subject to the vibrations, and consequent inaccuracies of record, which are inevitable when the instrument is carried on an airplane in flight, or by a military tractor, observation balloon, etc.

In order that the records produced by the elements A, B and C may be of uniform character, it is desirable that the contact of the recording pencils with the record strip be uniform. For that purpose, the pencil lead is held in a spring clip 70, having a limited play in the pencil carrier and is projectible from the clip by means of a threaded abutment 71. A spring 72' acts upon the clip to yieldingly hold it forward in the carrier and when the pencil contacts with the paper, the spring will yield.

A pencil 50 is carried by the armature of an electromagnet 76 in the circuit of which may be placed a push-button, so that the observer may produce a mark on the record strip at any desired time. By this arrangement, an aviator may indicate special points of observation to be considered in translating the record.

I claim as my invention:

1. A recording instrument comprising means for supporting a record-receiving element, a driving train for positively driving said record-receiving element and comprising means by which it may be connected to a motor the performance of which is to be noted, a plurality of record-producing elements arranged adjacent the record-receiving-element travel-line, means by which said record-producing elements may be moved into and out of record-producing position, a corresponding plurality of variable indicators, each connected to a record-producing member by means capable of shifting said record-producing member to vary its position relative to the record-receiving element in accordance with the variations of conditions of said indicator, a time train, a record-producing element arranged in position to be continuously in record-producing engagement with the record-receiving element, and means controlled by the time train for causing the last-mentioned record-producing element to shift from and to its normal position at predetermined time intervals.

2. A recording instrument comprising means for supporting a record-receiving element, a driving train for positively driving said record-receiving element and comprising means by which it may be connected to a motor the performance of which is to be noted, a plurality of record-producing elements arranged adjacent the record-receiving-element travel-line, means by which said record-producing elements may be moved into and out of record-producing position, a corresponding plurality of variable indicators, each connected to a record-producing member by means capable of shifting said record-producing member to vary its position relative to the record-receiving element in accordance with the variations of conditions of said indicator, a time train, a record-producing element arranged in position to be continuously in record-producing engagement with the record-receiving element, an electric circuit controlled by the time train, and means in said electric circuit and controlled thereby for intermittently shifting the last-mentioned record-producing element from and to normal position laterally of the line of movement of the record-receiving element.

3. A record-producing instrument comprising means for supporting the record strip, a driving train for positively driving said record strip, said driving train embodying means by which said train may be coupled with a motor the behavior of which is to be recorded, and also embodying speed-changing means by which the amount of record-receiving element affected during a given performance of the motor may be varied, and a plurality of recording elements arranged to act upon the record-receiving element, one of said recording elements being shiftable laterally of the record-receiving element and into and out of contact with said element at various positions of lateral adjustment, a variable indicator connected with said last-mentioned recording element for shifting the same laterally, and a time train intermittently actuating another of said recording elements.

4. A record-producing instrument comprising means for supporting the record strip, a driving train for positively driving said record strip, said driving train embodying means by which said train may be coupled with a motor, the behavior of which is to be recorded, and a plurality of recording elements arranged to act upon the record-receiving element, one of said recording elements being shiftable laterally of the record-receiving element and into and out of contact with said element at various positions of lateral adjustment, a variable indicator connected with said last-mentioned recording element for shifting the same laterally, and a time train intermittently actuating another of said recording elements.

5. A record-producing instrument comprising means for supporting a record strip, a driving train for positively driving said record strip and embodying means by which said train may be coupled with a motor, the behavior of which is to be recorded, a time train, a recording pencil arranged to contact with the record strip, a support for said record pencil, means controlled by the time train for intermittently shifting said record pencil to produce a record intermittently on the record strip, a plurality of other record pencils, a support for each of said other pencils yieldable toward and from record-producing position and also movable laterally of the record strip, a corresponding plurality of indicators, each variable in accordance with variations of conditions to be recorded, connections between each of said indicators and one of the pencil supports for shifting the said support laterally of the record strip, and means for intermittently shifting the plurality of recording pencils into and out of contact with the record strip.

6. A record-producing instrument comprising means for supporting a record strip, a driving train for positively driving said record strip and embodying means by which said train may be coupled with a motor, the behavior of which is to be recorded, a time train, a recording pencil arranged to contact with the record strip, a support for said record pencil, means controlled by the time train for intermittently shifting said record pencil to produce a record intermittently on the record strip, a plurality of other record pencils, a support for each of said other pencils yieldable toward and from record-producing position and also movable laterally of the record strip, a corresponding plurality of indicators, each variable in accordance with variations in conditions to be recorded, connections between each of said indicators and one of the pencil supports for shifting the said support laterally of the record strip, means for intermittently shifting said plurality of recording pencils into and out of contact with the record strip, said means comprising a sliding pawl normally urged in recording direction by a spring, a ratchet intermittently engaging said pawl and shifting the same against the action of said spring, a member connected with the recording pencil carriers to shift the recording pencils into and out of engagement with the record strip, a connection between said member and the sliding pawl having a limited amount of play, and a lighter spring acting upon said connection in a direction opposite to the first-mentioned spring.

7. A record-producing instrument comprising means for supporting a record strip, a driving train for positively driving said record strip and embodying means by which said train may be coupled with a motor, the behavior of which is to be recorded, a time train, a recording pencil arranged to contact with the record strip, a support for said recording pencil, means controlled by, but dynamically independent of, the time train, for intermittently shifting said recording pencil to produce a record intermittently on the record strip, a support for a second recording pencil shiftable toward and from record-producing position and also movable laterally of the record strip, an indicator variable in accordance with variations of conditions to be recorded, connections between said indicator and said second pencil support for shifting the said support laterally of the record strip, and means for intermittently shifting said second recording pencil into and out of contact with the record strip, said means comprising a sliding pawl normally urged in recording direction by a spring, a ratchet intermittently engaging said pawl and shifting the same against the action of said spring, a member connected with the second pencil support to shift the pencil thereof into and out of engagement with the record strip, a connection between said member and the sliding pawl having a limited amount of play, and a lighter spring acting upon said connection in a direction opposite to the first-mentioned spring.

8. A record-producing instrument comprising means for supporting a record strip, a driving train for positively driving said record strip and embodying means by which said train may be coupled with a motor, the behavior of which is to be recorded, a time train, a recording pencil arranged to contact with the record strip, a support for said recording pencil, means controlled by, but dynamically independent of, the time train, for intermittently shifting said recording pencil to produce a record intermittently on the record strip, a support for a second recording pencil shiftable toward and from record-producing position and also movable laterally of the record strip, an indicator variable in accordance with variations of conditions to be recorded, connections between said indicator and said second pencil support for shifting the said support laterally of the record strip, and means for intermittently shifting said second recording pencil into and out of contact with the record strip.

9. A record-producing instrument comprising means for supporting a record strip, a driving train therefor, a shaft arranged transversely of the record strip, a second shaft arranged parallel to the first shaft and revoluble about the axis of the first shaft, a sliding pencil carrier mounted upon said two shafts, a variable indicator, a connection between said variable indicator and the pencil carrier for shifting said carrier along the shafts in accordance with the variations of the indicator, and means for swinging the second shaft about the axis of the first shaft to shift the pencil carrier toward and from the record strip.

10. A record-producing instrument comprising a support for a record strip, a driving train for positively driving said record strip, a pencil carrier slidably mounted laterally of the record strip and movable toward and from the plane of the record strip in any position of lateral adjustment, an indicator having a fixed shaft, a link having a universal joint connection with the pencil carrier, and a connection between said link and the fixed shaft of the indicator.

11. A record-producing instrument, comprising means for supporting a record strip, a driving train for positively driving said record strip, a pencil carrier, a support upon which the pencil carrier may be shifted laterally of the record strip, said support being movable toward and from the plane of the record strip, and means for intermittently moving the pencil carrier support toward and from the plane of the record strip, said means comprising a sliding pawl, a spring acting upon said pawl to shift the pencil carrier support toward the plane of the record strip, a ratchet acting upon said pawl in opposition to said spring, a member connecting the sliding pawl with the pencil carrier support with a limited amount of play, and a light spring acting upon said connection in opposition to the first-mentioned spring.

12. A record-producing instrument, comprising means for supporting a record strip, a driving train for positively driving said record strip and embodying means by which said train may be coupled with a motor, the behavior of which is to be recorded, a time train, a recording pencil arranged to contact with the record strip, a support for said recording pencil, means controlled by the time train for intermittently shifting said support to produce an intermittent record on the record strip, a plurality of pencil supports arranged to slide laterally of the record strip, a support for each of said pencil carriers movable toward and from the plane of the record strip, means for intermittently shifting said supports toward and from the record strip plane, a barometer, a connection between said barometer and one of the sliding pencil supports to slide said support in accordance with variations of the barometer, a thermometer, connections between said thermometer and one of the sliding pencil strips to slide said support in accordance with variations of the thermometer, an air-speed indicator, connections between said air-speed indicator and one of the sliding pencil supports to slide said support in accordance with variations of the air-speed indicator, and means for intermittently shifting said pencil support toward and from the plane of the record.

13. A record-producing instrument, comprising means for supporting a record strip, a driving train for positively driving said record strip, a pencil carrier, a support upon which the pencil carrier may be shifted laterally of the record strip, said support being movable toward and from the plane of the record strip, and means dependent on movement of the record strip for automatically intermittently moving the pencil carrier support toward and from the plane of the record strip.

In witness whereof, I have hereunto set my hand at Indianapolis, Indiana, this 12th day of September, A. D. one thousand nine hundred and eighteen.

CLAUDE E. COX.